W. V. TURNER.
QUICK RELEASE VALVE DEVICE.
APPLICATION FILED APR. 17, 1917.
1,294,980.
Patented Feb. 18, 1919.
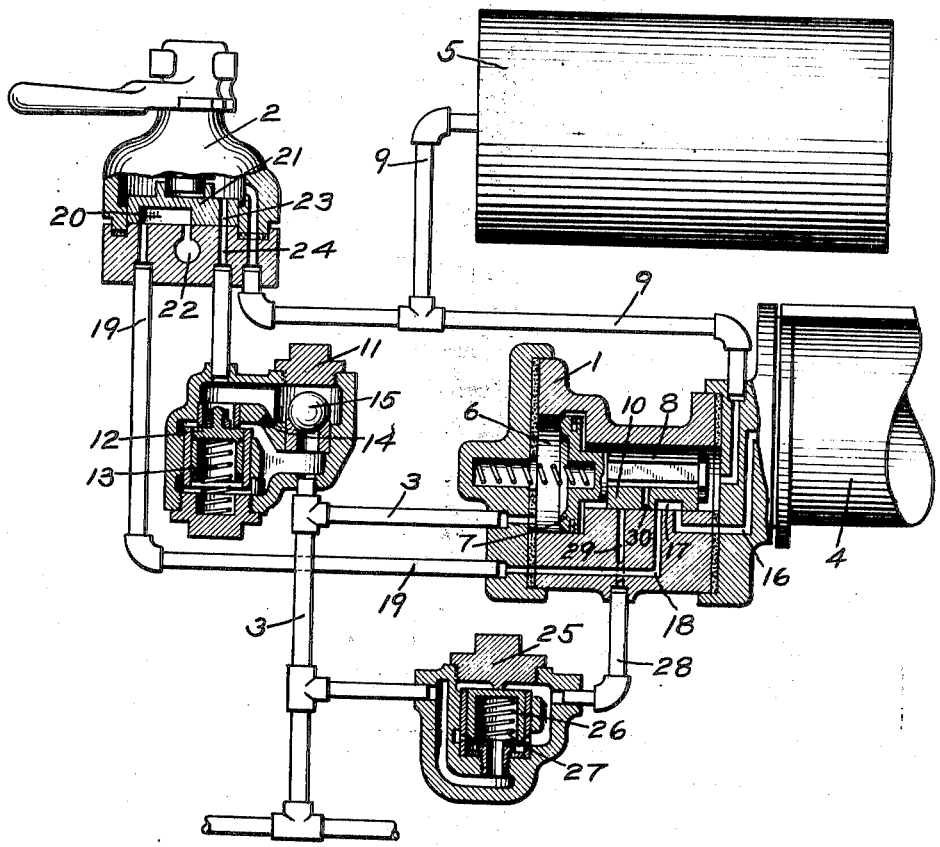
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

QUICK-RELEASE-VALVE DEVICE.

1,294,980.   Specification of Letters Patent.   Patented Feb. 18, 1919.

Application filed April 17, 1917.   Serial No. 162,673.

*To all whom it may concern:*

Be it known that I, WALTER V. TURNER, a citizen of the United States, residing at Wilkinsburg, in the county of Allegheny and State of Pennsylvania, have invented new and useful Improvements in Quick-Release-Valve Devices, of which the following is a specification.

This invention relates to fluid pressure brakes, and more particularly to a type of equipment known as the straight air emergency brake.

It is usual with equipments of the above character to provide a restricted port in the brake valve for supplying fluid to recharge the brake pipe in releasing the brakes so as to prevent excessive loss of fluid from the source of supply, in case the brake pipe is broken or a break-in-two occurs. The restricted supply port also prevents recharging of the brake pipe at such a rate as to interfere with obtaining an emergency reduction in brake pipe pressure where initiated by means other than the brake valve, as by operation of a conductor's valve, for example.

The slow recharge of the brake pipe, however, prevents the quick release of the brakes and the principal object of my invention is to provide an equipment of the above character having means for securing the quick release of the brakes.

In the accompanying drawing, the single figure is a diagrammatic view, partly in section, of a straight air emergency brake equipment embodying my invention.

As shown in the drawing, the equipment may comprise an emergency valve device 1, a brake valve 2, a brake pipe 3, brake cylinder 4, and a source of fluid under pressure, such as the main reservoir 5.

The emergency valve device 1 may comprise a casing having a piston chamber 6 connected to the brake pipe 3 and containing piston 7 and having a valve chamber 8 connected by pipe 9 to main reservoir 5 and containing a slide valve 10.

According to my invention, there is interposed in the brake pipe 3 adjacent to the brake valve 2, a valve device 11 comprising a casing containing a valve piston 12 subject on one side to the pressure of a spring 13 for controlling a large opening from the brake valve through the brake pipe.

A constantly open restricted port 14 is provided for supplying fluid at a limited rate to the brake pipe and a check valve 15 controls a communication through which fluid can be vented from the brake pipe at a rapid rate in applying the brakes by manipulation of the brake valve.

In operation, when the brake valve 2 is in release position, as shown in the drawing, the brake cylinder 4 is connected to the exhaust through passage 16, cavity 17 in slide valve 10, passage 18, straight air pipe 19, cavity 20 in the rotary valve 21, and exhaust port 22.

A straight air application of the brakes may be effected by turning the brake valve to straight air application position, in which fluid is supplied from the main reservoir 5 to the straight air pipe 19 and thence to the brake cylinder 4, in the usual manner.

When a sudden reduction in brake pipe pressure is effected, the emergency piston 7 is operated to shift the slide valve 10 and open a direct communication for supplying fluid from valve chamber 8 and the main reservoir to the brake cylinder, to cause an emergency application of the brakes.

In order to release the brakes after an emergency application, the brake valve 2 is turned to release position, in which, according to my invention, a large port 23 in the rotary valve 21 registers with brake pipe passage 24, so that fluid from the main reservoir is supplied to the adjacent side of the valve piston 12. Main reservoir pressure acting on the upper face of valve piston 12 is sufficient to overcome the reduced brake pipe pressure and the pressure of spring 13 acting on the opposite side, so that the valve piston is shifted to open a large communication from the brake valve to the brake pipe, thereby quickly raising the brake pipe pressure. When the brake pipe pressure has been increased to a predetermined degree, the increased brake pipe pressure with the pressure of spring 13 operates to close the valve piston 12 and further recharging of the brake pipe is now effected through the restricted port 14.

When an emergency application of the brakes is initiated by means of the brake valve, the rapid venting of fluid from the brake pipe is effected through the large opening provided by the lifting of check valve 15.

With the above construction, since the valve piston 12 closes after the brake pipe pressure has been increased to a predetermined degree, the completion of the recharge of the brake pipe is at a slow rate. With the construction covered by my co-pending application, Serial No. 162,679, filed April 17, 1917, the quick recharge of the brake pipe depends upon increasing the brake pipe pressure to a predetermined degree, so that initially the brake pipe pressure is increased at a slow rate.

By employing both devices in the same equipment, the quick recharge of the brake pipe is made effective throughout the entire recharge period and I may therefore employ, as shown in the drawing, the valve device of the patent application hereinbefore referred to.

This valve device is indicated by the reference numeral 25 and comprises a casing containing a valve piston 26 subject on one side to the pressure of a spring 27 and brake pipe pressure and having the opposite side connected to a pipe 28 and a passage 29 leading to the seat of slide valve 10.

When the emergency piston 7 is shifted to emergency position, the slide valve 10 is moved so that a port 30 registers with passage 29 and fluid from the valve chamber 8 and the main reservoir is supplied to one face of the valve piston 26. The reduction in brake pipe pressure on the opposite side permits the main reservoir pressure to overcome the resistance of spring 27 and thereby shift the valve piston 26 so as to cut off communication from pipe 28 to brake pipe 3.

Upon increasing the brake pipe pressure to release the brakes, when the brake pipe pressure has been increased to a predetermined degree, the brake pipe pressure and the pressure of spring 27 acts to shift the valve piston 26 to open communication from pipe 28 to the brake pipe 3, so that fluid is then supplied to the brake pipe.

It will now be seen that by employing both devices, in releasing the brakes, the valve device 11 operates immediately upon movement of the brake valve to release position to supply fluid to the brake pipe at a rapid rate, and the subsequent opening of the valve device 25 operates to maintain the rapid supply of fluid to the brake pipe after the valve device 11 closes.

Having now described my invention, what I claim as new and desire to secure by Letters Patent, is:—

1. In a fluid pressure brake, the combination with a brake pipe, a brake valve, and a source of fluid under pressure, of means operated by the flow of fluid from said source through the brake valve in releasing the brakes for supplying fluid from the brake valve to the brake pipe at a more rapid rate than the normal rate.

2. In a fluid pressure brake, the combination with a brake pipe, a brake valve, and a source of fluid under pressure, of means operated by fluid supplied through the brake valve from said source for opening a large port through which fluid is supplied from the brake valve to the brake pipe, said port being of greater capacity than the normal supply port.

3. In a fluid pressure brake, the combination with a brake pipe, a brake valve, and a source of fluid under pressure, of a valve device having means operated by fluid supplied from said source through the brake valve for opening a large port from the brake valve to the brake pipe, said valve device having a constantly open restricted port through which fluid is supplied to the brake pipe at a limited rate.

4. In a fluid pressure brake, the combination with a brake pipe, a brake valve, and a source of fluid under pressure, of a valve device having means operated by fluid supplied from said source through the brake valve for opening a large port from the brake valve to the brake pipe, said valve device having a check valve controlled passage for permitting fluid to be vented from the brake pipe through the brake valve.

5. In a fluid pressure brake, the combination with a brake pipe, a brake valve, and a source of fluid under pressure, of a valve device operated upon a predetermined increase in brake pipe pressure for supplying fluid from said source to the brake pipe, and a valve device operated by flow of fluid from the brake valve for opening a large port for supplying fluid from said source through the brake valve to the brake pipe.

6. In a fluid pressure brake, the combination with a brake pipe, a brake valve, a source of fluid under pressure, and an emergency valve device, of a valve device operated by flow of fluid from said source through the brake valve for supplying fluid from said source through the brake valve to the brake pipe and a valve device operated upon an increase in brake pipe pressure for supplying fluid from said source through said emergency valve device to the brake pipe.

In testimony whereof I have hereunto set my hand.

WALTER V. TURNER.